US012796863B2

(12) United States Patent
Sul et al.

(10) Patent No.: US 12,796,863 B2
(45) Date of Patent: Nov. 17, 2026

(54) AUTOMATIC OIL FILTERING FRYER

(71) Applicants: Andy Sul, Hawaiian Gardens, CA (US); Dabin Sul, Alhambra, CA (US)

(72) Inventors: Andy Sul, Hawaiian Gardens, CA (US); Dabin Sul, Alhambra, CA (US)

(*) Notice: Subject to any disclaimer, the term of this patent is extended or adjusted under 35 U.S.C. 154(b) by 994 days.

(21) Appl. No.: 18/090,386

(22) Filed: Dec. 28, 2022

(65) Prior Publication Data

US 2023/0320529 A1 Oct. 12, 2023

(30) Foreign Application Priority Data

Apr. 12, 2022 (KR) ........................ 10-2022-0044879

(51) Int. Cl.
*A47J 37/12* (2006.01)

(52) U.S. Cl.
CPC ....... *A47J 37/1223* (2013.01); *A47J 37/1266* (2013.01); *A47J 37/1285* (2013.01)

(58) Field of Classification Search
CPC . A47J 37/1223; A47J 37/1266; A47J 37/1285
See application file for complete search history.

(56) References Cited

U.S. PATENT DOCUMENTS

| | | | | |
|---|---|---|---|---|
| 12,075,945 B1 * | 9/2024 | Highnote | ............ | A47J 37/1233 |
| 2016/0051092 A1 * | 2/2016 | Bang | .................. | A47J 37/1266 99/408 |

FOREIGN PATENT DOCUMENTS

| | | | | |
|---|---|---|---|---|
| KR | 101211833 B1 * | 12/2012 | .......... | A47J 37/1223 |

* cited by examiner

*Primary Examiner* — Tiffany T Tran

(57) ABSTRACT

The present invention provides an automatic oil filtering fryer comprising: a frying oil container; an oil discharging pipe transferring used oil to the first oil filtering device; a first oil filtering device located below the frying oil container and filtering and grinding the used oil to form a first filtered oil; an oil transferring pipe transferring the first filtered oil up to a second oil filtering device by using a pump; the pump raising and transferring the first filtered oil upward to the second oil filtering device; the second oil filtering device located above the frying oil container and filtering the first filtered oil to form a second filtered oil; and an oil supplying pipe supplying the second filtered oil to the frying oil container.

19 Claims, 12 Drawing Sheets

AUTOMATIC OIL FILTERING FRYER

CROSS-REFERENCE TO RELATED APPLICATIONS

This application is a continuation-in-part of U.S. patent application Ser. No. 17/865,323, entitled "Automatic Oil Filtering Fryer", filed Jul. 14, 2022, which claims the foreign priority benefit under 35 U.S.C. § 119 of Korean Patent Application No. 10-2022-0044879, filed on Apr. 12, 2022, and the entire disclosure of which is hereby incorporated by reference.

FIELD OF THE INVENTION

The present invention relates to a fryer, and more particularly to a fryer equipping with a function of treating oil.

BACKGROUND OF THE INVENTION

Recently, as diverse food cultures are widely spread and created in many ways, fried foods such as fried chicken and fast food becomes popular all over the world, and various cooking oils used to fry food are being introduced. High quality cooking oils, which are expensive, such as olive oil, are also emerging for taste and health of food. Accordingly, some restaurants or households that use a large amount of cooking oil reuse the cooking oils to avoid burden of high cost of cooking oils.

Specifically, in some restaurants, after pouring new cooking oil into an oil tank of a fryer, the oil is repeatedly used in the fryer many times. However, as the use of the cooking oil is repeated, taste of food can change, or an unhealthy substance can be generated while cooking due to food carbonization caused by frying residue floating in the frying oil. Therefore, with conventional fryers, there is a limitation in frying food by using cooking oil multiple times, and it is necessary to discard cooking oil that has been used several times and to repurchase new cooking oil frequently.

As described above, repeated use of cooking oil reduces the taste of food and generates substances harmful to health. In addition, repurchasing cooking oil gives cost burden to users, and disposing of cooking oil causes resource wastes and environmental pollution.

The present invention has been devised to solve the problems described above, and the object of the present invention is to provide an automatic oil filtering fryer that is configured to have a simple structure occupying a small space with an automatic oil refining function, thereby increasing user convenience and time efficiency, producing healthy and tasty food with clean cooking oil, reducing food producing cost, and preventing waste and environmental pollution.

SUMMARY OF THE INVENTION

According to one embodiment of the present invention, an automatic oil filtering fryer 10 comprises: a frying oil container 103 that is filled with oil so that an ingredient is to be fried therein and that has an outlet 103O through which used oil O0 inside the frying oil container 103 is discharged, and an inlet 103I through which filtered oil through automatic oil filtering is supplied; an oil discharging pipe 109 one end connected to the outlet 103O, the other end extending downward to be connected to a first oil filtering device 107, and transferring the used oil O0 to the first oil filtering device 107; the first oil filtering device 107 located below the frying oil container 103, receiving the used oil O0 from the frying oil container 103 through the oil discharging pipe 109, and filtering the used oil O0 to form first filtered oil O1; an oil transferring pipe 111 one end connected to the first oil filtering device 107, the other end extending upward to be connected to a second oil filtering device 113, and transferring the first filtered oil O1 up to the second oil filtering device 113 by using a pump 112; a pump 112 that is installed on the oil transferring pipe 111 and pumps to raise the first filtered oil O1 inside the first oil filtering device 107 upward to transfer the first filtered oil O1 to the second oil filtering device 113; the second oil filtering device 113 located above the frying oil container 103, receiving the first filtered oil O1 from the first oil filtering device 107 through the transferring pipe and the pump 112, and filtering the first filtered oil O1 to form second filtered oil O2; and an oil supplying pipe 115 one end connected to the second oil filtering device 113, the other end extending downward to be connected to the inlet 103I of the frying oil container 103 and supplying the second filtered oil O2 to the frying oil container 103.

In some embodiments, a bottom surface of the frying oil container 103 may include a slope part 103S that is inclined from a first edge 103SE1 of the slope part 103S toward a second edge 103SE2 of the slope part 103S that is positioned in an opposite side of the first edge 103SE1, wherein a depth of the slope part 103S becomes deeper as it goes from the first edge 103SE1 to the second edge 103SE2, wherein a width of the slope part 103S becomes narrower as it goes from the first edge 103SE1 to the second edge 103SE2.

In some embodiments, the outlet 103O may be positioned at a lower portion of a sidewall of the frying oil container 103 that meets the second edge 103SE2.

In some embodiments, the automatic oil filtering fryer 10 may further comprise a valve 110 that is installed on the oil discharging pipe 109 and adjusts opening degrees of the oil discharging pipe 109 to control an oil level of the frying oil container 103 and a rate of the automatic oil filtering.

In some embodiments, the first oil filtering device 107 may include: a metal mesh part 107M directly receiving the used oil O0 transferred through the oil discharging pipe 109 and filtering the used oil O0 to form first primary filtered oil O11 by passing it through the metal mesh part 107M; a grinder 107G installed on an inner space of the first outer container 107C and grinding debris contained in the first primary filtered oil O11 to form first filtered oil O1; and a first outer container 107C formed to contain the metal mesh part 107M and the grinder 107G, receiving the first filtered oil O1, and transferring the first filtered oil O1 to the oil transferring pipe 111.

In some embodiments, the first outer container 107C may include a first sidewall that the oil transferring pipe 111 is connected to and communicated with and a second side wall that is located in an opposite side to the first sidewall, and the grinder 107G may be installed on the second sidewall.

In some embodiments, the grinder 107G may include: a motor 107GM providing rotational power; a circular plate 107GP connected to the motor and rotating according to the rotation of the motor 107GM; and a plurality of blades 107GB coupled onto the circular plate 107GP, wherein debris contained in the first filtered oil O1 is pulverized by the plurality of rotating blades 107GB.

In some embodiments, the metal mesh part 107M may be configured to have a container shape.

In some embodiments, the metal mesh part 107M may be configured to have a flat shape, and the metal mesh part 107M may include a metal mesh 107MM and a frame 107MF surrounding an edge of the metal mesh 107MM.

In some embodiments, the second oil filtering device 113 may include: a frame part 113M on which a fabric part 113P is mounted; the fabric part 113P directly receiving the first filtered oil O1 transferred through the oil transferring pipe 111 and filtering the first filtered oil O1 to form second filtered oil O2 by passing it through the fabric part 113P; and a second outer container 113C formed to contain the frame part 113M and the fabric part 113P, receiving the second filtered oil O2 discharged from the fabric part 113P, and supplying the second filtered oil O2 to the frying oil container 103 through the oil supplying pipe 115.

In some embodiments, the fabric part 113P may be made of a material that is manufactured with fibers, and a hole formed by adjacent wires of the metal mesh part 107M may be bigger than a hole formed by adjacent fibers of the fabric part 113P.

In some embodiments, each of the frame part 113M and the fabric part 113P may be configured to have a container shape, and the fabric part 113P may be configured to cover an inner surface of the frame part 113M.

In some embodiments, each of the frame part 113M and the fabric part 113P may be configured to have a flat shape, and the fabric part 113P may be located above the frame part 113M inside the second outer container 113C, wherein the frame part 113M may include a metal mesh 113MM and a frame 113MF surrounding an edge of the metal mesh 113MM.

In some embodiments, a heating unit 105 may be installed inside the frying oil container 103 and heating the oil O0.

In some embodiments, the heating unit 105 may comprise a plurality of metal fibers.

According to another embodiment of the present invention, an automatic oil filtering fryer 10 comprises: a frying oil container 103 that includes a bottom surface having a slope part 103S, wherein as it goes from the first edge 103SE1 to the second edge 103SE2, a depth of the slope part 103S becomes deeper and a width of the slope part 103S becomes narrower, wherein an outlet 103O through which used oil O0 is discharged, is positioned at a lower portion of a sidewall of the frying oil container 103 that meets the lowest edge of the slope part 103S; a first oil filtering device 107 located below the frying oil container 103, filtering the used oil O0 to form first filtered oil O1, and including: a metal mesh part 107M directly receiving the used oil O0 from the frying oil container 103 through an oil discharging pipe 109 connected to the outlet 103O, and filtering the used oil O0 to form first primary filtered oil O11 by passing it through the metal mesh part 107M; a grinder 107G installed on an inner space of the first outer container 107C and grinding debris contained in the first primary filtered oil O11 to form first filtered oil O1; and a first outer container 107C formed to contain the metal mesh part 107M and the grinder 107G, receiving the first filtered oil O1, and transferring the first filtered oil O1 to a transferring pipe 111; a pump 112 raising the first filtered oil O1 from the first oil filtering device 107 upward and supplying it to a second oil filtering device 113; the second oil filtering device 113 located above the frying oil container 103, filtering the first filtered oil O1 to form second filtered oil O2, and including: a fabric part 113P directly receiving the first filtered oil O1 transferred from the first oil filtering device 107 through an oil transferring pipe 111 and filtering the first filtered oil O1 to form second filtered oil O2 by passing it through the fabric part 113P; and a second outer container 113C formed to contain the frame part 113M and the fabric part 113P, receiving the second filtered oil O2 discharged from the fabric part 113P, and supplying the second filtered oil O2 to the frying oil container 103 through an oil supplying pipe 115.

In some embodiments, the first outer container 107C may include a first sidewall that the oil transferring pipe 111 is connected to and communicated with and a second sidewall that is located in an opposite side to the first sidewall, and the grinder 107G may be installed on the second sidewall.

In some embodiments, the grinder 107G may include: a motor 107GM providing rotational power; a circular plate 107GP connected to the motor and rotating according to the rotation of the motor; and a plurality of blades 107GB coupled onto the circular plate, wherein debris contained in the first primary filtered oil O1 may be pulverized by the plurality of rotating blades 107GB.

In some embodiments, the automatic oil filtering fryer may further comprise a valve 110 that is installed on the oil discharging pipe 109 and adjusts opening degrees of the oil discharging pipe 109 to control an oil level of the frying oil container 103 and a rate of the automatic oil filtering.

In some embodiments, a heating unit 105 may be installed inside the frying oil container 103 and heating the oil O0, wherein the heating unit 105 comprises a plurality of metal fibers.

DETAILED DESCRIPTION EMBODIMENTS OF THE INVENTIONS

Hereinafter, preferred embodiments according to the present invention will be described in detail in conjunction with the accompanying drawings.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In addition, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
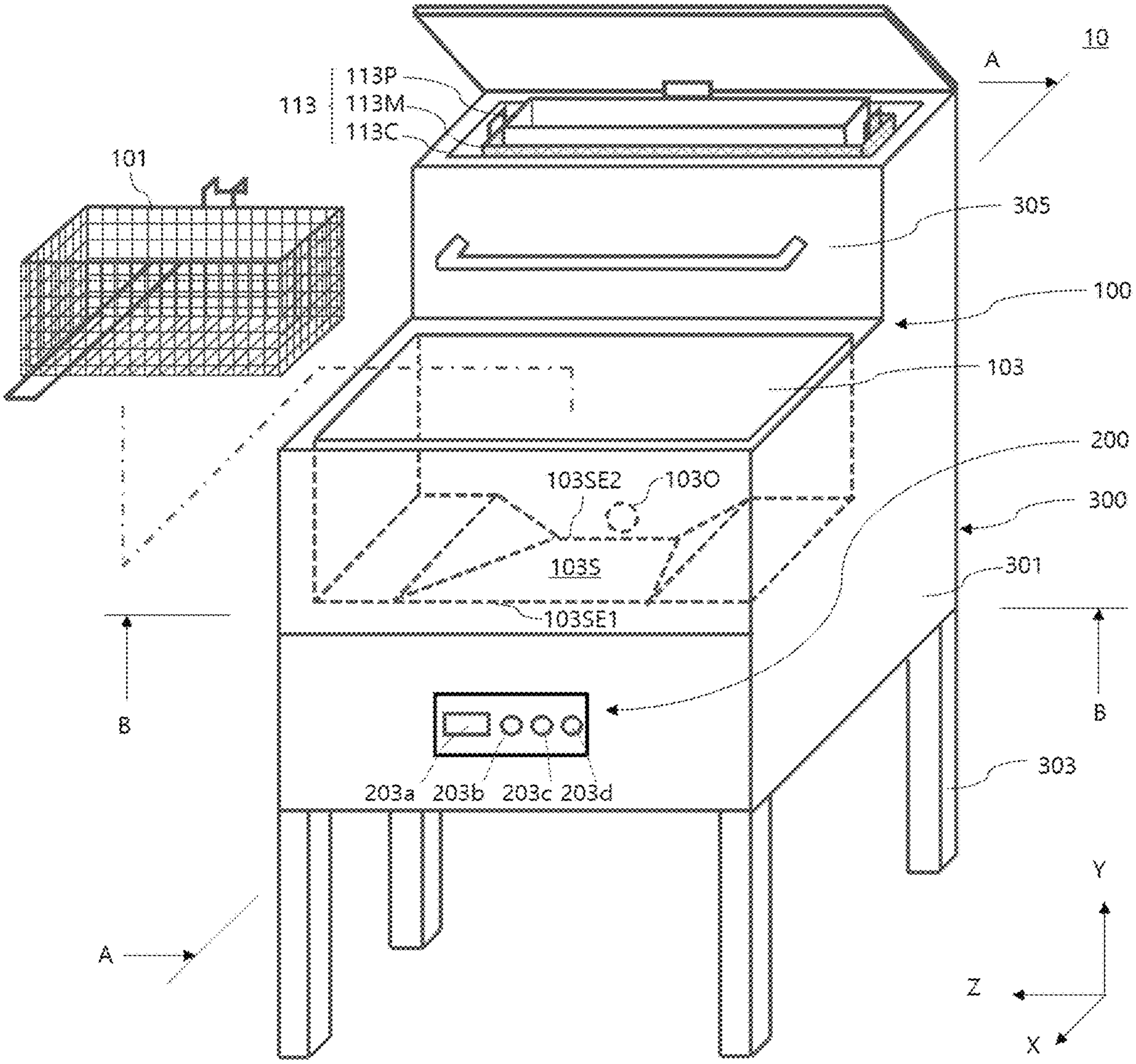
FIG. 1 is a schematic perspective view illustrating an external appearance of an automatic oil filtering fryer 10 according to one embodiment of the present invention.
Figure 2:
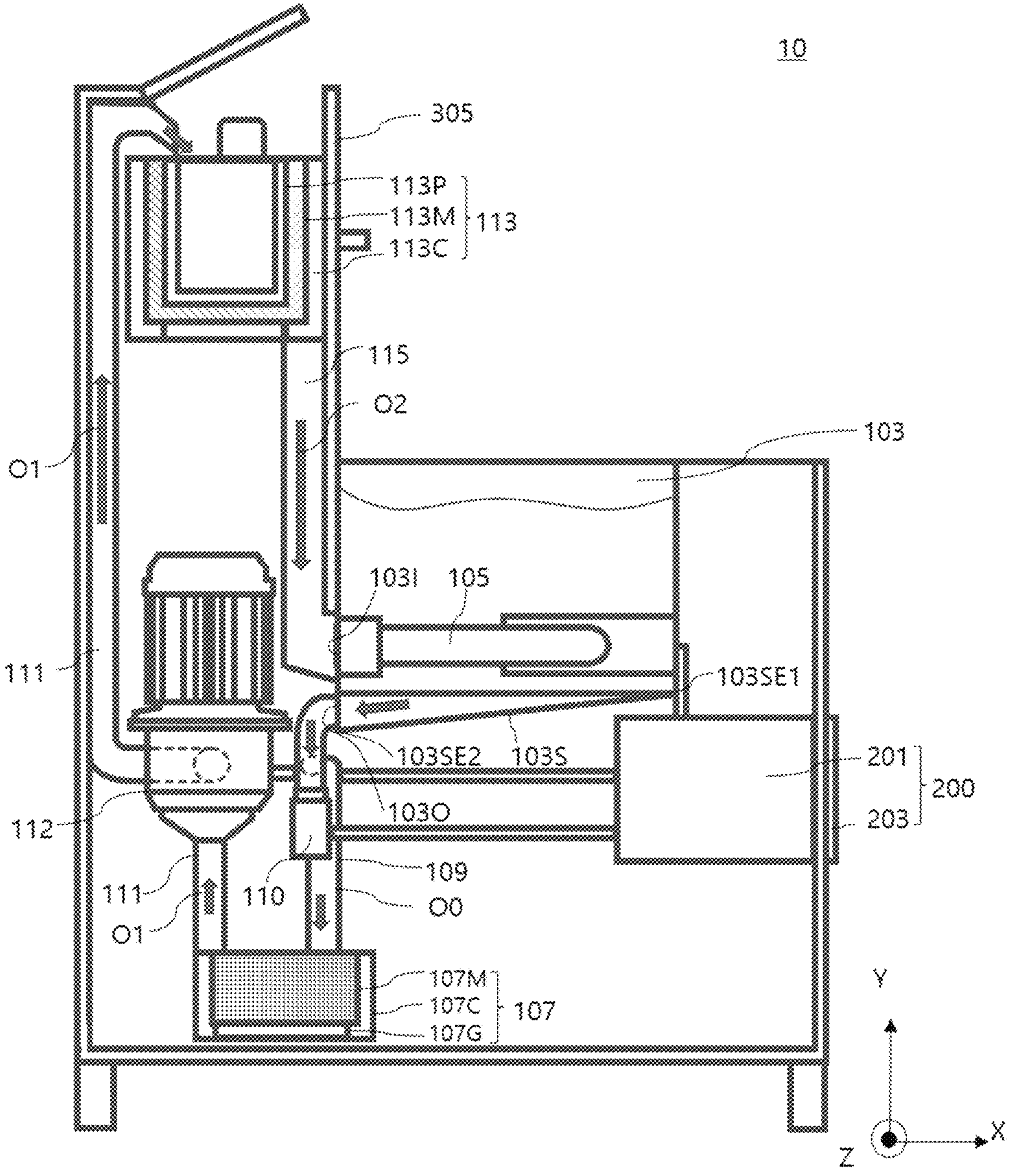
FIG. 2 is a cross sectional view of the automatic oil filtering fryer 10 in FIG. 1 cut along A-A line according to one embodiment of the present invention.
Figure 3:
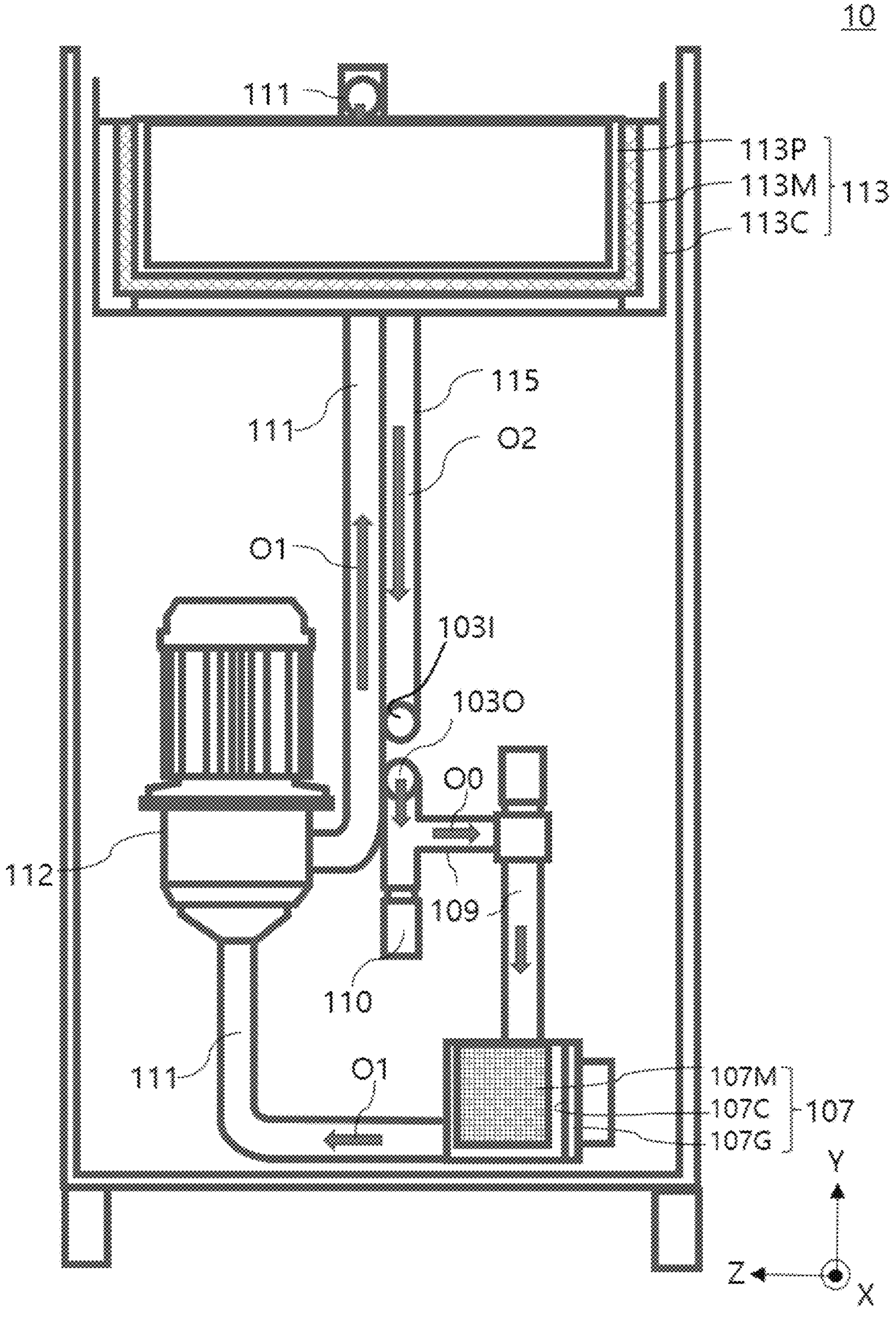
FIG. 3 is a cross sectional view of the automatic oil filtering fryer 10 in FIG. 1 cut along B-B line according to one embodiment of the present invention.

FIG. 1 is a schematic perspective view illustrating an external appearance of an automatic oil filtering fryer 10 according to one embodiment of the present invention. FIG. 2 is a cross sectional view of the automatic oil filtering fryer 10 in FIG. 1 cut along A-A line according to one embodiment of the present invention. FIG. 3 is a cross sectional view of the automatic oil filtering fryer 10 in FIG. 1 cut along B-B line according to one embodiment of the present invention.

Referring to FIGS. 1 to 3, the automatic oil filtering fryer 10 comprises: a body 100 performing functions of filtering oil and frying an ingredient, a controller 200 performing functions of setting and controlling automatic operation, and a housing 300 accommodating and supporting the body 100 and the controller 200.

The body 100 may comprise: an ingredient support unit 101; a frying oil container 103 into which the ingredient support unit 101 is to be contained; a heating unit 105 installed inside the frying oil container 103; an oil discharging pipe 109 transferring the used oil O0 from the frying oil container 103 to a first oil filtering device 107; a valve 110 installed on the oil discharging pipe 109; the first oil filtering device 107 located below the frying oil container 103, filtering the used oil O0 to form first primary filtered oil O11, and grinding debris contained in the first primary filtered oil O11; an oil transferring pipe 111 transferring the first filtered oil O1 from the first oil filtering device 107 to a second oil filtering device 113; a pump 112 installed on the oil transferring pipe 111; the second oil filtering device 113 located above the frying oil container 103 and filtering the first filtered oil O1 to form second filtered oil O2; and an oil supplying pipe 115 transferring the second filtered oil O2 from the first oil filtering device 107 to the frying oil container 103.

In addition, the body 100 may further comprise: a thermometer and an oil level sensor both installed inside the frying oil container 103. Furthermore, the body 100 may further comprise an oil discharging pump installed inside the oil discharging pipe to assist discharging the used oil O0 from the frying oil container 103.

Specifically, the ingredient support unit 101 may include an ingredient supporting part, a handle, and a hook. The ingredient supporting part is a part on which an ingredient is placed. The ingredient may be any kind of food including meat such as chicken, vegetable such as potato, dough, and a combination of any of them but is not limited thereto. The ingredient supporting part has a plurality holes so that oil enters inside and fries the ingredient. In some embodiments, the ingredient supporting part may be made of metal based wires and have a loose mesh shape. The ingredient supporting part of the food support unit 101 may have any one shape of a flat screen or a basket but is not limited thereto. The handle of the ingredient support unit 101 may be formed on at least one top edge of the ingredient support unit 101 and be configured to be gripped by a user so that the ingredient support unit 101 can be easily movable. The hook of the ingredient support unit 101 may be formed on at least one top edge of the ingredient support unit 101 and be configured to be hung on a head 305 of the housing 300.

The frying oil container 103 is filled with oil and is a space where the ingredient support unit 101 is to be contained and where the ingredient is fried. The frying oil container 103 may be filled with oil by manual supply of new oil at the very initial step. Then, while discharging the used oil O0 having debris into the oil discharging pipe 109, the frying oil container 103 is filled with filtered oil O2 using the used oil O0 through the automatic oil filtering process of the automatic oil filtering fryer 10.

Figure 4:
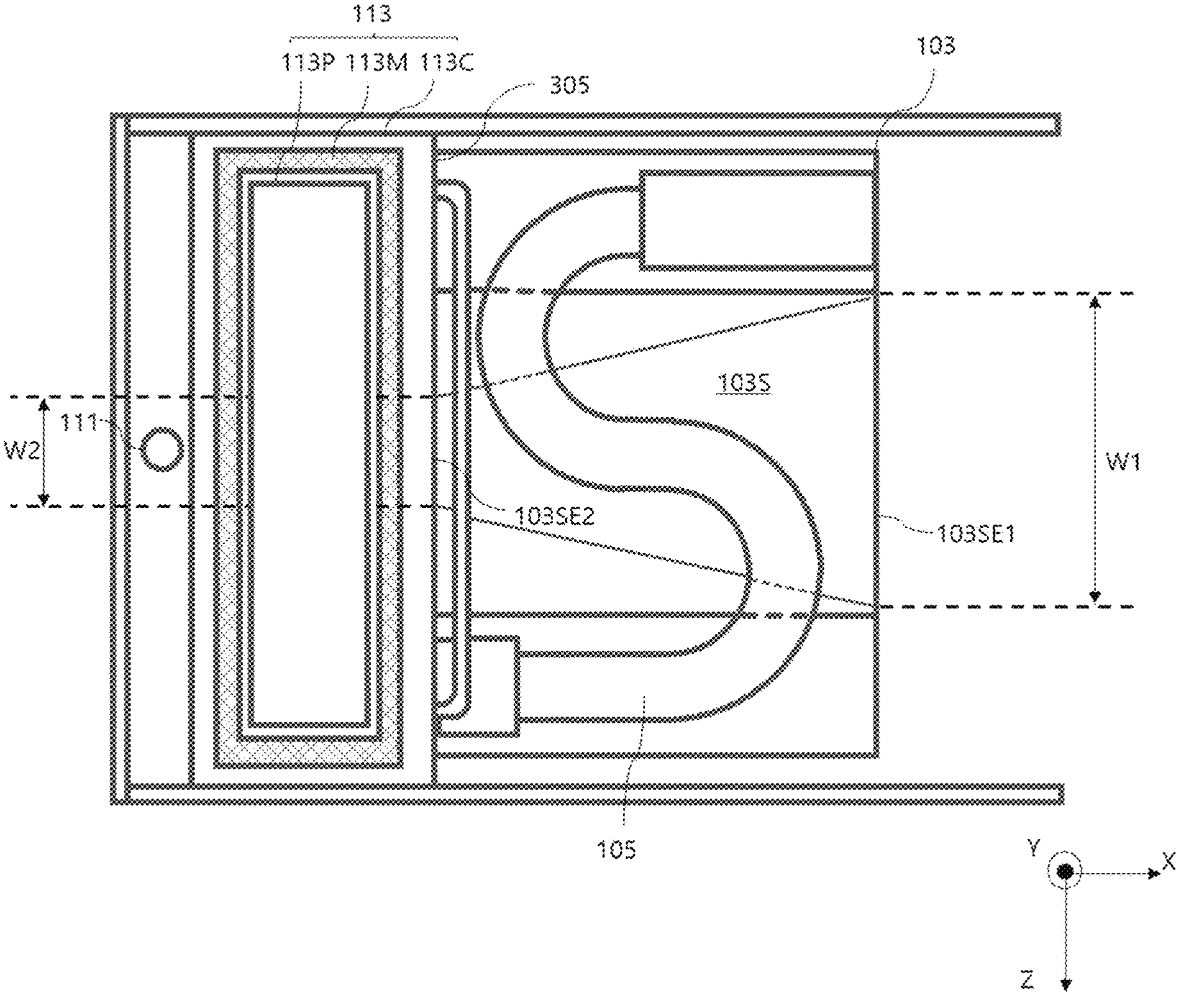
FIG. 4 is a top view of the automatic oil filtering fryer 10 in FIG. 1 according to one embodiment of the present invention.

FIG. 4 is a top view of the automatic oil filtering fryer 10 in FIG. 1 according to one embodiment of the present invention. Referring to FIG. 4 together, a bottom surface of the frying oil container 103 includes a slope part 103S that is inclined from a first edge 103SE1 of the slope part 103S toward a second edge 103SE2 of the slope part 103S that is positioned in an opposite side of the first edge 103SE1. In other words, the slope part 103S may be a trench shape in which each of a bottom and both sidewalls are inclined. In this case, as it goes from the first edge 103SE1 to the second edge 103SE2, a depth of the slope part 103S becomes deeper, and a width of the slope part 103S becomes narrower. Thus, a width W1 of the first edge 103SE1 is larger than a width W2 of the second edge 103SE2. Accordingly, the used oil O0 inside the frying oil container 103 is guided through the slope part 103S and flow toward the second edge 103SE2.

Meanwhile, an outlet 103O through which the used oil O0 is discharged, is positioned at a lower portion of a sidewall of the frying oil container 103 that meets the second edge 103SE2. Thus, the used oil O0 guided through the slope part 103S to the second edge 103SE2 is automatically discharged through the outlet 103O. The frying oil container 103 also includes an inlet 103I through which filtered oil is supplied.

The heating unit 105 is provided to heat the oil inside the frying oil container 103 and may be installed inside the frying oil container 103. The heating unit 105 may comprise a plurality of metal fibers. Since the metal fibers in the heating unit 105 can heat oil rapidly and maintain excellent resilience, cooking productivity can increase.

Figure 11:
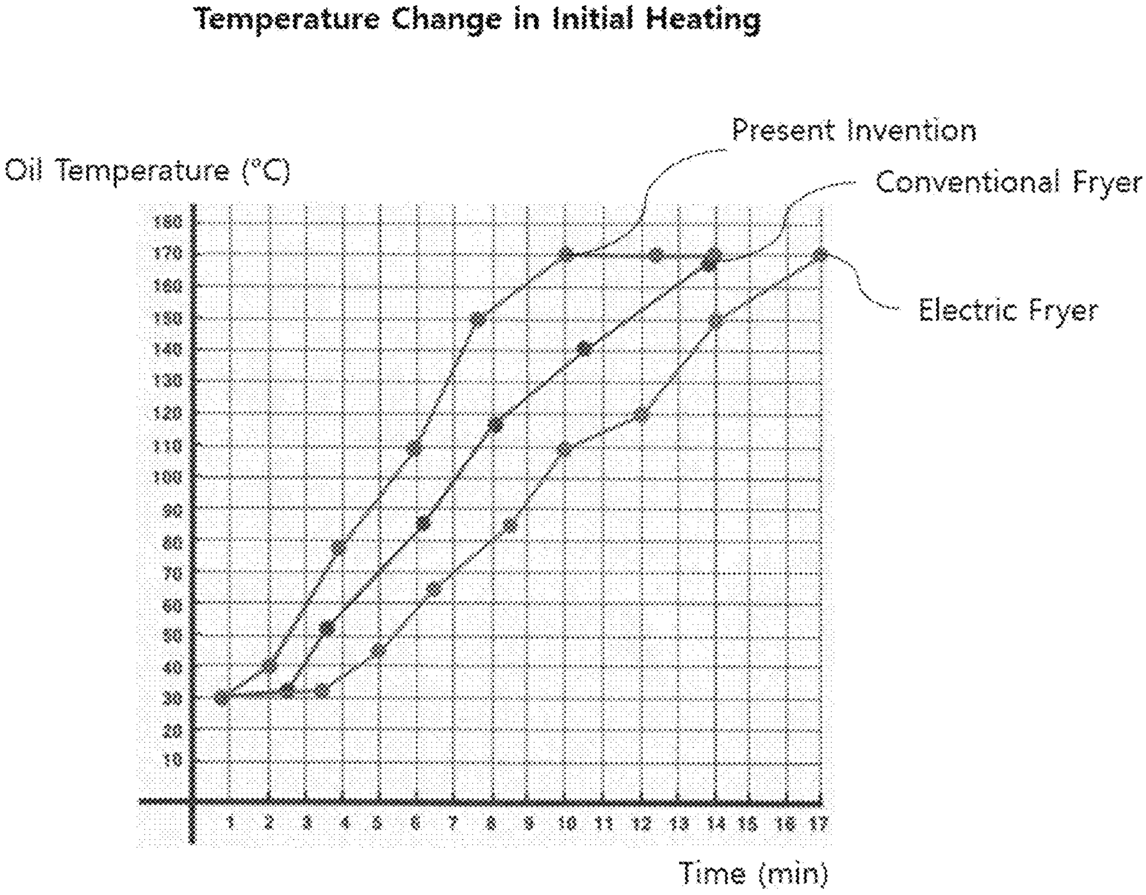
FIG. 11 is a graph of temperature change in initial heating of the present invention, a conventional fryer, and an electric fryer.

FIG. 11 is a graph of temperature change in initial heating of the present invention, a conventional fryer, and an electric fryer. Referring to FIG. 11, the automatic oil filtering fryer 10 of the present invention reaches to a target temperature of about 170 °C in approximately 10 minutes. On the other hand, a conventional fryer reaches to the same temperature in approximately 14 minutes, and an electric fryer in approximately 17 minutes. This result shows that metal fibers of the heating unit 105 enables rapid heating of oil, thereby enhancing productivity.

Figure 12:
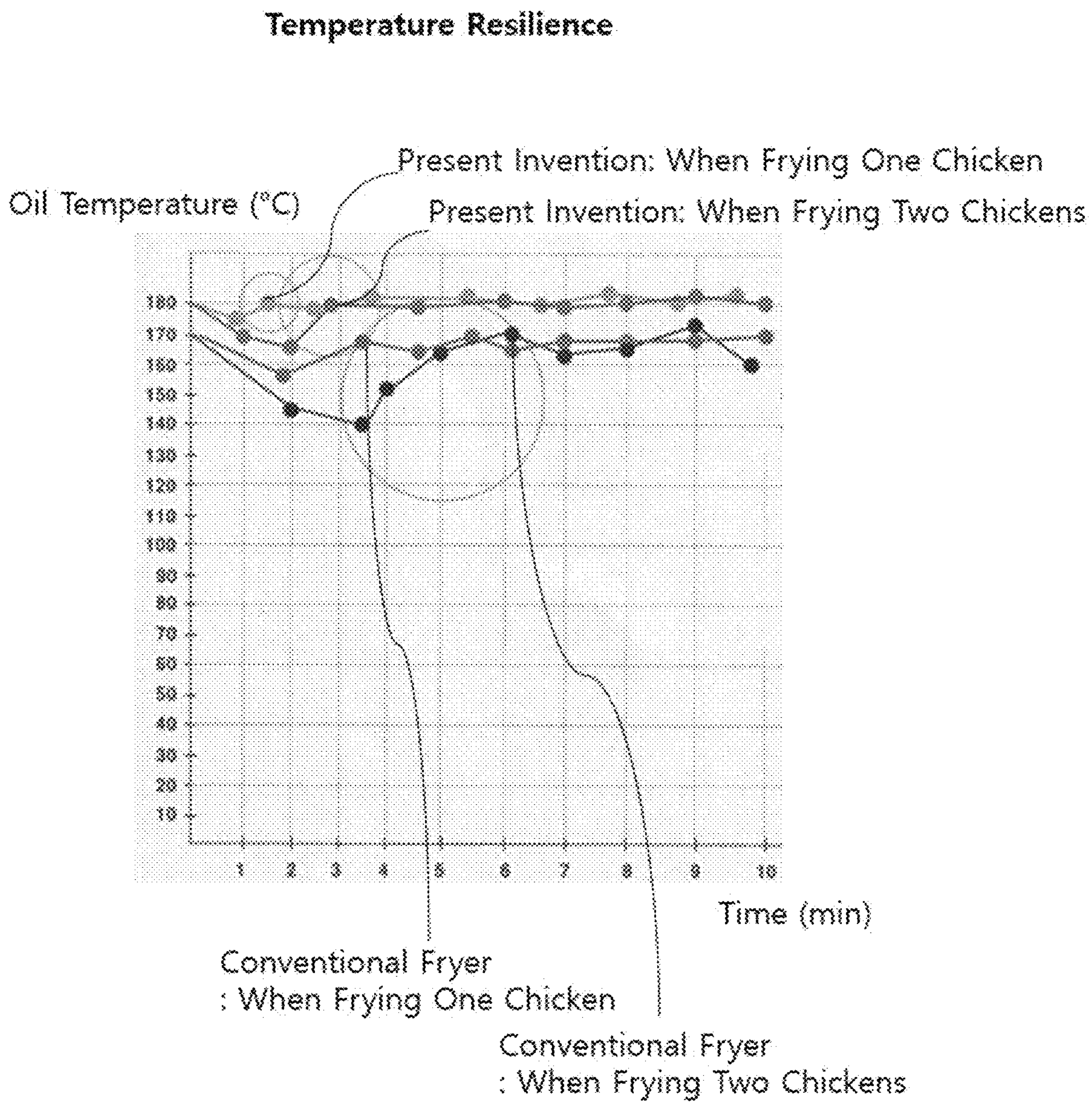
FIG. 12 is a graph of temperature resilience of the present invention and a conventional fryer.

FIG. 12 is a graph of temperature resilience of the present invention and a conventional fryer. Referring to FIG. 12, when frying 900 g of a chicken, the automatic oil filtering fryer 10 of the present invention recovers its initial temperature of about 180 °C in approximately 1.5 minutes. In contrast, under the same condition of frying 900 g of a chicken, a conventional fryer recovers its initial temperature of 170 °C in approximately 3.5 minutes. When frying two chickens, the automatic oil filtering fryer 10 of the present invention recovers its initial temperature of 180 °C in approximately 1.8 minutes. In contrast, under the same condition of frying two chickens, the conventional fryer recovers its initial temperature of about 170 °C in approximately 6.2 minutes. The result shows that the present invention can recover its initial temperature more than twice as quickly as the conventional fryer.

In addition, since the heating unit 105 having metal fibers provides complete combustion, it can maximize thermal efficiency and significantly reduce costs. There is about 60% reduction in gas volume when using the metal fiber type heating unit 105. Furthermore, since the metal fibers in heating unit 105 can keep temperature of oil inside the frying oil container 103 constant, the taste of fried food can be kept constant.

In drawings, the heating unit 105 is positioned on a bottom of an inner space of the frying oil container 103 but may be positioned a lateral side of the inside thereof. In some embodiments, the heating unit 105 may be installed at an adjacent area to the frying oil container 103 outside the frying oil container 103.

As the heated oil fries the ingredient in the frying oil container 103, various debris with different sizes are occurred in the used oil O0 by being fallen off the ingredient and/or by chemical reactions between ingredient debris and the used oil O0. As described above, the used oil O0 containing various debris in the frying oil container 103 is guided through the sloped part 103S toward the outlet 103O positioned at the second edge 103SE2 and is discharged into the oil discharging pipe 109 at a predetermined rate.

The oil discharging pipe 109 includes one end connected to the outlet 103O of the frying oil container 103 and the other end extending downward to be connected to a first oil filtering device 107 and transfers the used oil O0 discharged from the frying oil container 103 into the first oil filtering device 107. The oil discharging pipe 109 may be further equipped with the valve 110. In some embodiments, the oil discharging pipe 109 may be configured to include two parts: a horizontal pipe and a vertical pipe but is not limited thereto.

The valve 110 installed on the oil discharging pipe 109 can adjust opening degrees of the oil discharging pipe 109 to control an oil level of the frying oil container 103 and a rate of the automatic oil filtering. For the automatic oil filtering process, the valve 110 has to be maintained in an open state. Based on a desired filtering rate or speed of a user, the valve 110 may be controlled to be open partially or entirely. Meanwhile, since the valve 110 also has an additional effect of controlling an oil level of the frying oil container 103, the valve 110 can prevent the oil in the frying oil container 103 from overflowing as well as control the automatic oil filtering process of the frying oil container 103.

Figure 5:
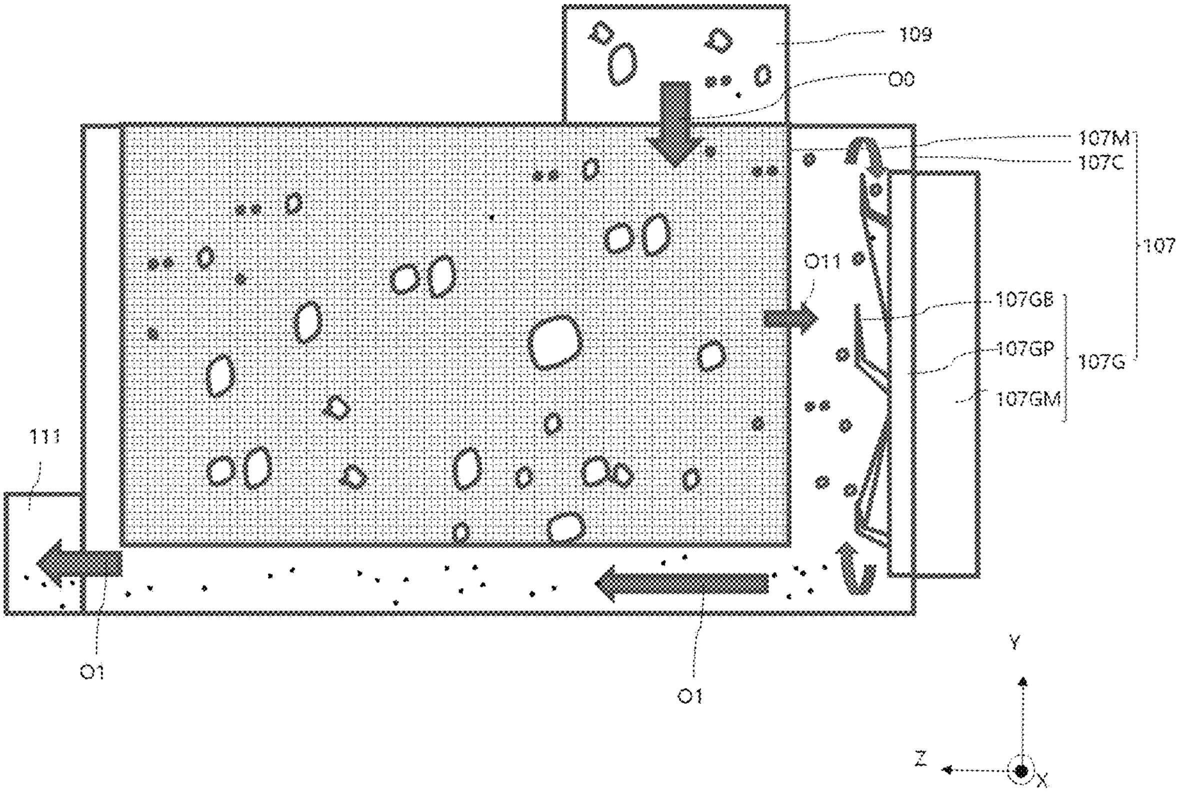
FIG. 5 is a drawing illustrating an operation of a first oil filtering device 107 of the automatic oil filtering fryer 10 in FIG. 1 according to one embodiment of the present invention.

The first oil filtering device 107 is located below the frying oil container 103 and receives the used oil O0 discharged from the frying oil container 103 through the oil discharging pipe 109. FIG. 5 is a drawing illustrating an operation of a first oil filtering device 107 of the automatic oil filtering fryer 10 in FIG. 1 according to one embodiment of the present invention. Referring to FIG. 5 together, the first oil filtering device 107 may include: a metal mesh part 107M filtering the used oil O0 first and forming first primary filtered oil O11; a grinder 107G grinding debris contained in the first primary filtered oil O11 and forming first filtered oil O1; and a first outer container 107C containing the metal mesh part 107M and the grinder 107G.

The metal mesh part 107M may directly receive the used oil O0 transferred through the oil discharging pipe 109 and filter the used oil O0 to form the first primary filtered oil O11 by passing it through the metal mesh part 107M.

Although many debris are removed from the first primary filtered oil O11 by the metal mesh part 107M, there may be small debris in the first primary filtered oil O11, which have passed through a hole of the metal mesh part 107M. These small debris contained in the first primary filtered oil O11 may be additionally ground or pulverized by the grinder 107G.

Figure 6:
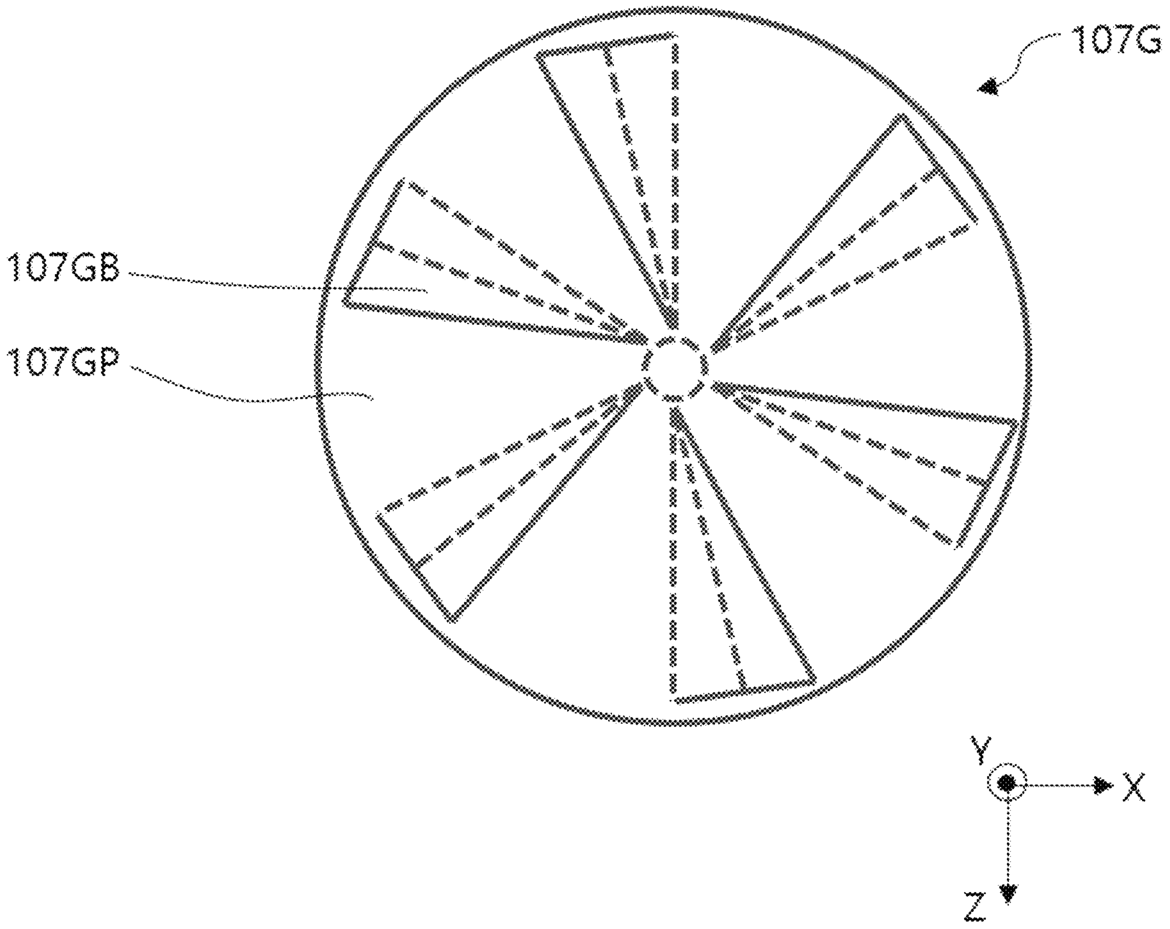
FIG. 6 is a top view of a grinder 107G of the first oil filtering device 107 of the automatic oil filtering fryer 10 in FIG. 1 according to one embodiment of the present invention.

FIG. 6 is a top view of a grinder 107G of the first oil filtering device 107 of the automatic oil filtering fryer 10 in FIG. 1 according to one embodiment of the present invention. Referring to FIG. 6 together, the grinder 107G may be installed on an inner space of the first outer container 107C and grinds debris contained in the first primary filtered oil O11. The grinder 107G may include: a motor 107GM providing rotational power; a shaft connecting between the motor 107GM and a circular plate 107GP; the circular plate 107GP connected to the shaft and rotating according to the rotation of the motor 107GM; and a plurality of blades 107GB coupled onto the circular plate 107GP.

Specifically, the circular plate 107GP has a first surface and a second surface opposite to the first surface, and the shaft is connected to the first surface of the circular plate 117GP, and the plurality of blades 117GB are fixedly coupled to the second surface of the circular plate 117GP. Since the blades 117GB are fixedly coupled to a surface of the circular plate 117GP, noise, which may occur in a conventional pump, can be prevented, and the blades 117GB can be prevented from being damaged due to low flow resistance.

With this grinder 107G, fine debris contained in the first primary filtered oil O11 may be pulverized by the plurality of rotating blades 107GB, thereby forming first filtered oil O1 which only contains fine debris.

This ground, or pulverized, fine debris contained in the first filtered oil O1 can be filtered by a fabric part 113P of the second oil filtering device 113, which is described later, and form the second filtered oil O2.

Accordingly, the metal mesh part 107M filters relatively big debris contained in the used oil O0 first, and then, the fabric part 113P can be used to filter only relatively small debris contained in the first filtered oil O11 down to fine level. As a result of the dual filtering process with the grinding process, the used oil O0 can become clean oil in which almost all of the debris with various sizes can be removed. Even if micro quantitative debris remain in the second filtered oil O2, they cannot affect adverse effects to color or taste of fried food since the sizes of the remaining debris are on fine level and its amount is extremely little.

In addition, since the relatively big debris has already removed from the first primary filtered oil O11, and the fabric part 113P only filters the relatively small debris, the fabric part 113P is not clogged and can be used in a long term. In addition, since the metal mesh part 107M is made of metal based wires, relatively big debris filtered by and placed on the metal mesh part 107M can be easily removable. Therefore, the metal mesh part 107M is permanently reusable after removing the filtered debris.

For the dual filtering process described above, the metal mesh part 107M may be made of metal based wires, and a hole formed by adjacent wires of the metal mesh part 107M may be bigger than a hole formed by adjacent fibers of the fabric part 113P. In some embodiments, the fabric part 113P may be made of a fiber based material, such as paper, cloth, and the like.

The grinder 107G may be installed on an inner sidewall of the first outer container 107C. The inner sidewall on which the grinder 107G is installed may be located in an opposite side to another inner sidewall to which the oil transferring pipe 111 is connected. The first primary filtered oil O11 discharged from the metal mesh part 107M may be pulled toward the grinder 107G by a pulling force formed by a rotation of the grinder 107G. Accordingly, the first primary filtered oil O11 passes through the grinder 107G, and debris in the first primary filtered oil O11 are ground to fine level by the grinder 107G, thereby forming the first filtered oil O1. The first filtered oil O1 containing the fine debris moves toward the oil transferring pipe 111 by the pump 112.

Meanwhile, in some embodiments, the metal mesh part 107M may be configured to have a container shape, but the present invention is not limited thereto.

Figure 9:
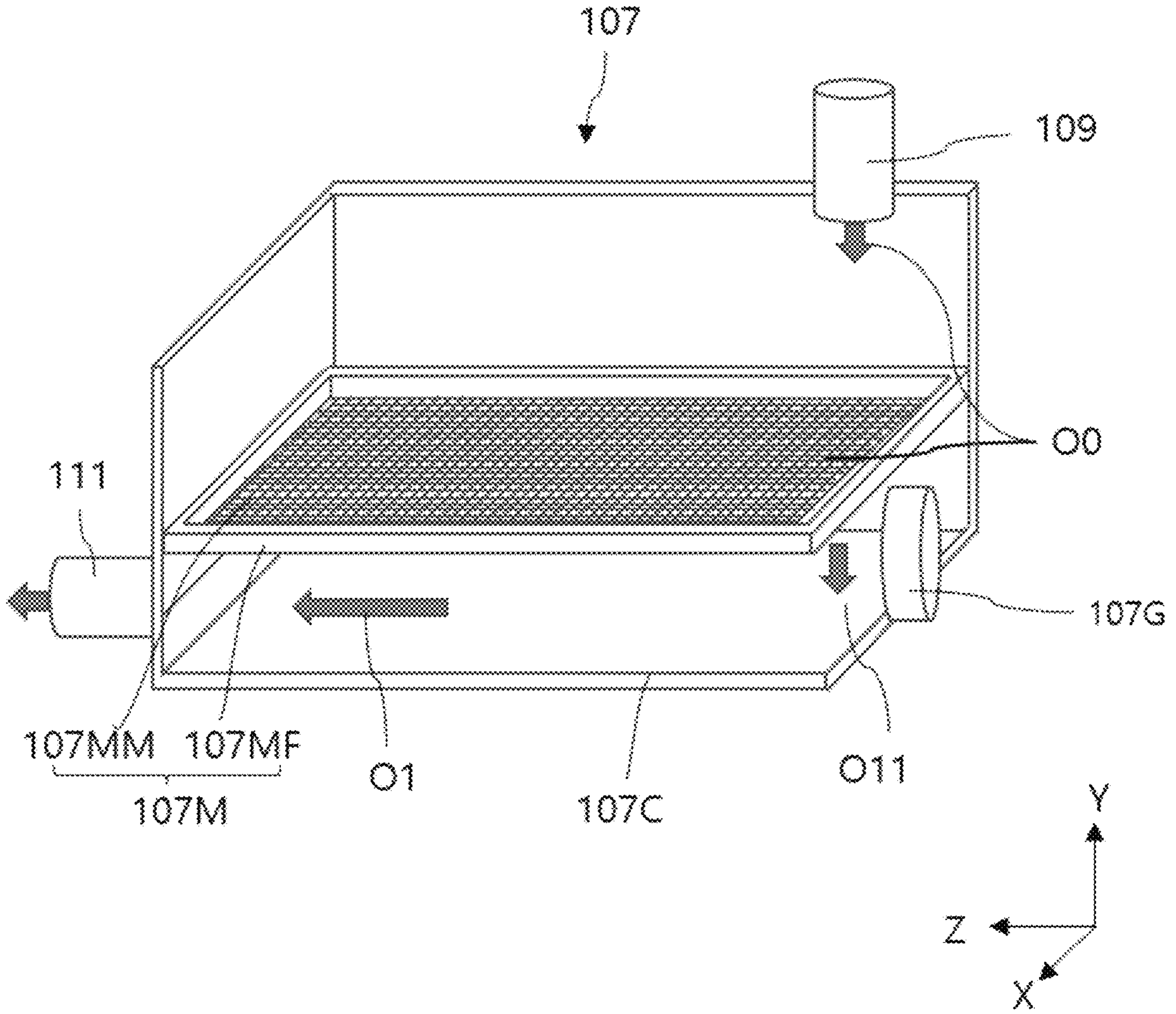
FIG. 9 is a drawing illustrating an operation of a first oil filtering device 107 of the automatic oil filtering fryer 10 in FIG. 1 according to another embodiment of the present invention.

FIG. 9 is a drawing illustrating an operation of a first oil filtering device 107 of the automatic oil filtering fryer 10 in FIG. 1 according to another embodiment of the present invention. According to these embodiments, each of the metal mesh part 107M may be configured to have a flat shape. In this case, the metal mesh part 107M may include a metal mesh 107MM and a frame 107MF surrounding an edge of the metal mesh 107MM. The metal mesh 107MM may be made of metal based wires, and the frame 107MF may be made of elvan to prevent the metal mesh 107MM from floating.

The first outer container 107C receives the first filtered oil O1 which has been passed through the metal mesh part 107M and the grinder 107G, and transfer the first filtered oil O1 to the oil transferring pipe 111.

The oil transferring pipe 111 includes one end connected to the first oil filtering device 107 and the other end extending upward to be connected to the second oil filtering device 113 and transfers the first filtered oil O1 up to the second oil filtering device 113 by using a pump 112.

The pump 112 is installed on the oil transferring pipe 111 and pumps to raise the first filtered oil O1 inside the first oil filtering device 107 upward to transfer and supply the first filtered oil O1 to the second oil filtering device 113. Specifically, the oil transferring pipe 111 may have two parts: a first pipe connecting between the first filtering oil device 107 and the pump 112, and a second pipe connected between the pump 112 and the second oil filtering device 113. The pump 112 enables automatic oil filtering circulation from the first oil filtering device 107 located below the frying oil container 103 to the second oil filtering device 113 located above the frying oil container 103.

In some embodiments, the automatic oil filtering fryer 10 may further comprise the oil level sensor that is installed inside the frying oil container 103 and detects an oil level of the frying oil container 103. In this case, the valve 110 can control the oil level of the frying oil container 103 at a predetermined limit level, regardless of a volume of the ingredient contained in the frying oil container 103. That is, when the controller 200 receives oil level information from the oil level sensor that the oil level is about to exceed the predetermined limit level, the controller 200 controls the oil level in the frying oil container 103 by opening the valve 110 to a higher degree or accelerating the pump 112.

In some embodiments, the automatic oil filtering fryer 10 may further comprise an oil discharging pump installed on the oil discharging pipe 109 and accelerate discharge of the used oil O0 by pumping the used oil O0 to flow downward from the frying oil container 103 into the first oil filtering device 107 through the oil discharging pipe 109. In this case, the oil discharging pump may include: a motor, a shaft, a circular plate, and a plurality of blades coupled onto the circular plate, and the blades can also grind or pulverize debris contained in the used oil O0 by using rotational power.

In some embodiments, the automatic oil filtering fryer 10 may further comprise the thermometer installed inside the frying oil container 103 to measure temperature of the oil in the frying oil container 103.

The second oil filtering device 113 is located above the frying oil container 103 and receives the first filtered oil O1 transferred from the first oil filtering device 107 through the oil transferring pipe 111. The second oil filtering device 113 may include: a frame part 113M on which the fabric part 113P is mounted; the fabric part 113P filtering the first filtered oil O1; and a second outer container 113C containing the frame part 113M and the fabric part 113P.

Figure 7:
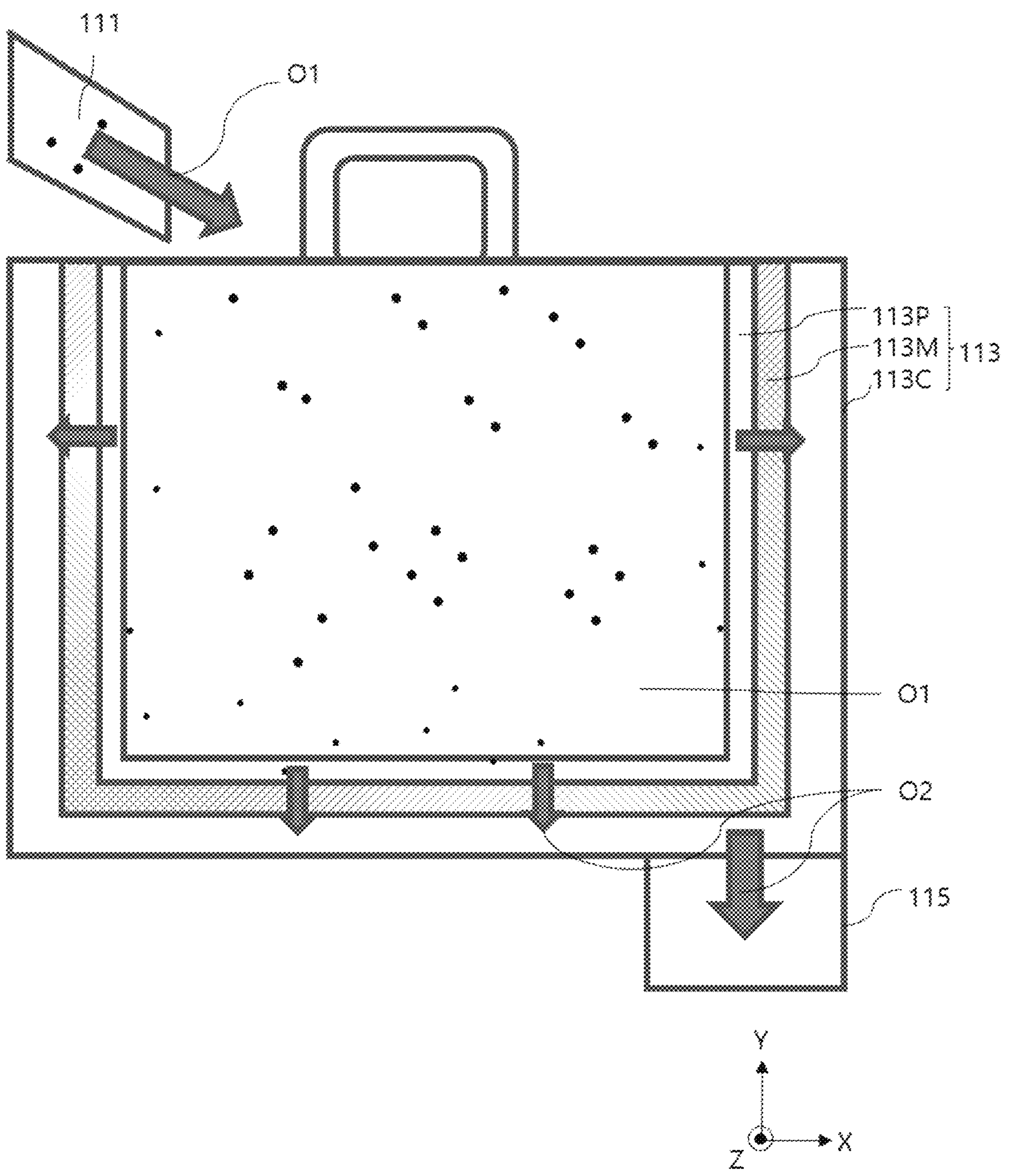
FIG. 7 is a drawing illustrating an operation of a second oil filtering device 113 of the automatic oil filtering fryer 10 in FIG. 1 according to one embodiment of the present invention.

FIG. 7 is a drawing illustrating an operation of a second oil filtering device 113 of the automatic oil filtering fryer 10 in FIG. 1 according to one embodiment of the present invention. Referring to FIG. 7 together, the fabric part 113P may mount on the frame part 113M and directly receive the first filtered oil O1 transferred through the oil discharging pipe 109 and filter the first filtered oil O1 to form second filtered oil O2 by passing it through the fabric part 113P.

In this case, the frame part 113M may be made of metal based wires, and the fabric part 113P may be made of a fiber based material, such as paper, cloth, and the like. Since the relatively big debris has been already removed or ground to fine level in the first filtered oil O1, and the fabric part 1132 can be used to filter only relatively small debris, the fabric part 113P is not clogged and can be used in a long term. As mentioned above, with the dual filtering process and the grinding process by using the metal mesh part 107M and the grinder 107G of the first oil filtering device 117 and the fabric part 113P of the second oil filtering device 113, the second filtered oil O2 can become clean oil in which almost all the debris are removed.

Each of the frame part 113M and the fabric part 113P may be configured to have a container shape, and the fabric part 113P may be configured to cover an inner surface of the frame part 113M.

Figure 10:
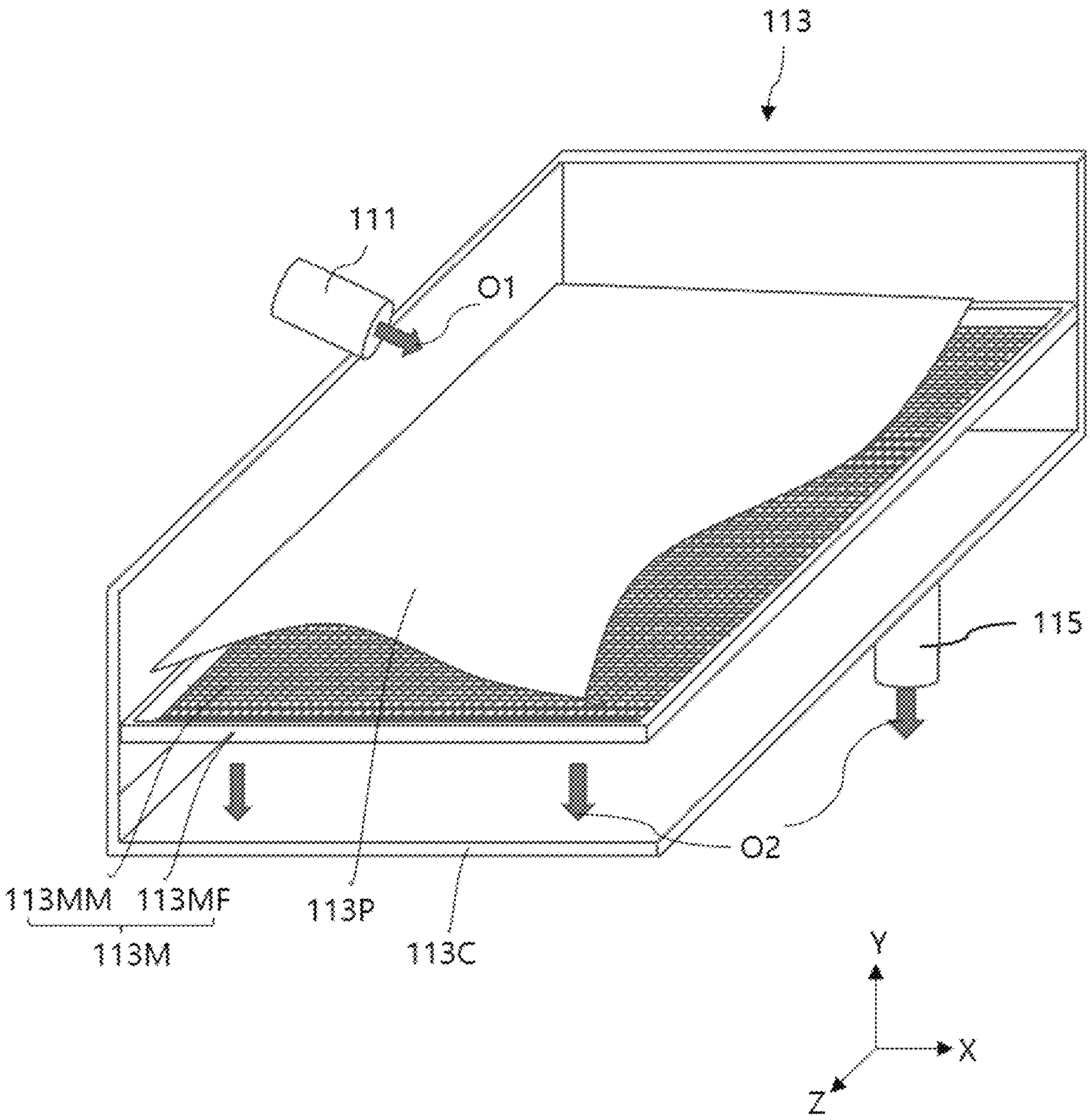
FIG. 10 is a drawing illustrating an operation of a second oil filtering device 113 of the automatic oil filtering fryer 10 in FIG. 1 according to another embodiment of the present invention.

FIG. 10 is a drawing illustrating an operation of a second oil filtering device 113 of the automatic oil filtering fryer 10 in FIG. 1 according to another embodiment of the present invention. Referring to FIG. 10 together, each of the frame part 113M and the fabric part 113P may be configured to have a flat shape, and the fabric part 113P may be located above the frame part 113M inside the second outer container 113C. In this case, the frame part 113M may include a metal mesh 113MM and a frame 113MF surrounding an edge of the metal mesh 113MM. The metal mesh 113MM may be made of metal based wires, and the frame 113MF may be made of elvan to prevent the metal mesh 113MM from floating. However, the present invention is not limited thereto. The frame part 113M may be simply formed by metal mesh.

The second outer container 113C receives the second filtered oil O2 which has been passed through the fabric part 113P and supplies the second filtered oil O2 to the oil supplying pipe 115.

The oil supplying pipe 115 includes one end connected to the second oil filtering device 113 and the other end extending downward to be connected to the inlet 103I of the frying oil container 103 and supplies the second filtered oil O2 to the frying oil container 103.

Figure 8:
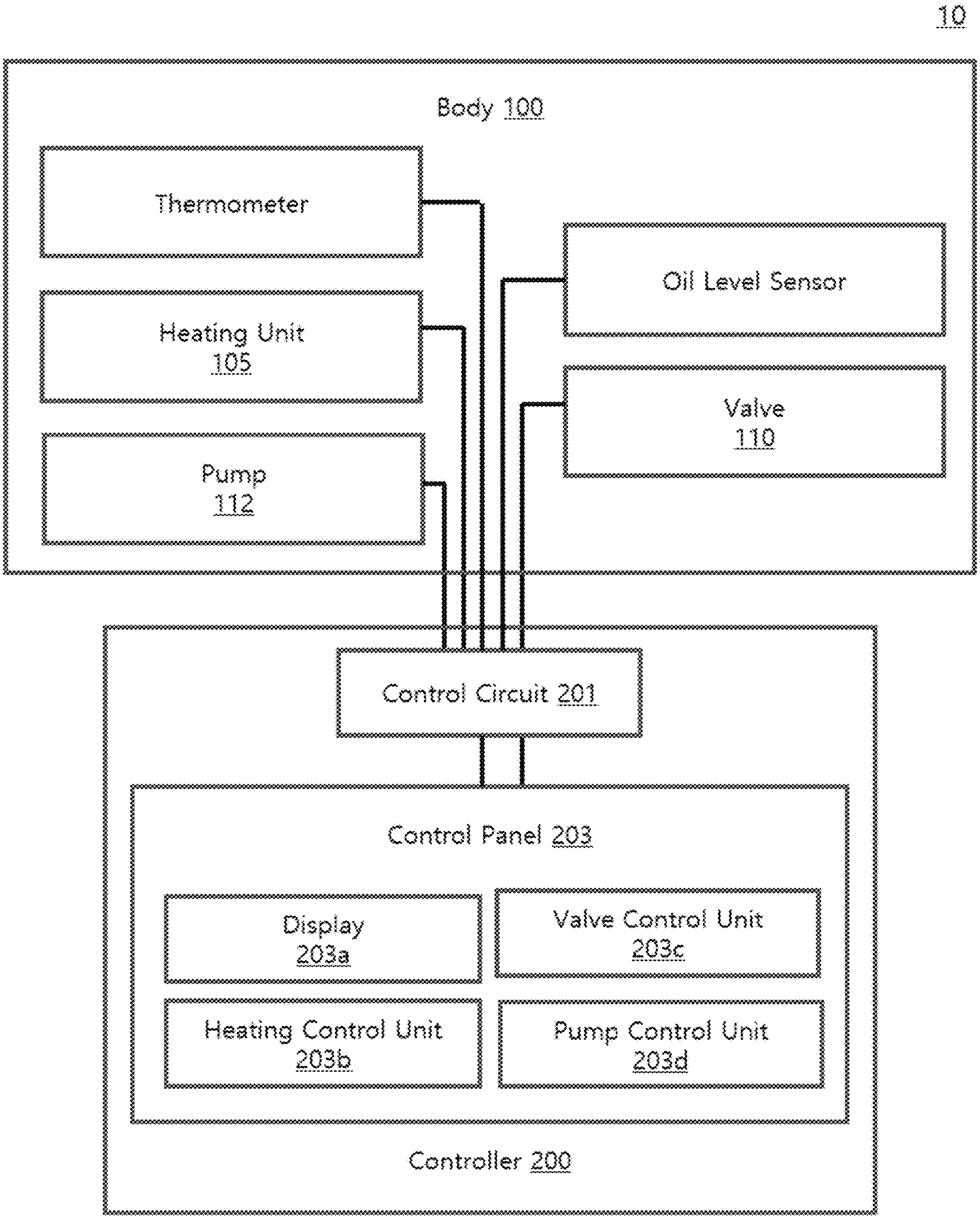
FIG. 8 is a diagram illustrating an automatic oil filtering fryer 10 according to the embodiment of the present invention.

FIG. 8 is a diagram illustrating an automatic oil filtering fryer 10 according to the embodiment of the present invention. Referring to FIG. 8 together, the controller 200 can set and control an operation of the automatic oil filtering fryer 10. The controller 200 may comprise: a control circuit 201 and a control panel 203.

The control circuit 201 may receive oil temperature information, oil level information, valve information, heating unit information, pump information, and others from a thermometer, the oil level sensor, the valve 110, the heating unit 105, and the pump 112, respectively, and transmit all the information to a control panel 203. The control circuit 201 can automatically control the heating unit 105, the valve 110, and the pump 112 according to predetermined settings.

The control panel 203 may have the display 203*a*, a heating control unit 203*b*, a valve control unit 203*c*, and a pump control unit 203*d*, which enables the user to control them by manual manipulation. The functions of the controller 200 are not limited to the aforementioned elements, and the controller 200 may be used to control other types of configurations installed in the automatic oil filtering fryer 10.

The housing 300 comprises: a cover 301 accommodating the body 100 and the controller 200; legs 303 supporting the cover 301, the body 100, and the controller 200; and a head 305 on which the ingredient support unit 101 may be hung.

As described above, the present invention provides the automatic oil filtering fryers 10 in which the used oil O0 can be automatically filtered through the two dual filtering processes and the grinding or pulverization process to keep supplying the filtered oil O2 for reuse. Since the automatic oil filtering fryer 10 can automatically operate, a user does not need to control the fryer manually and can use it conveniently.

In addition, since the second filtered oil O2 is obtained by the two dual filtering processes and the grinding or pulverization process, almost all the debris are removed. Thus, the reuse efficiency is significantly high, and the cost for new oil is saved by about 30%. Furthermore, trans fat, which occurs when frying food with oil, can reduce by about 40 to 50% by removing remaining fried debris with this automatic oil filtering fryer 10. Moreover, the taste and color of the food are kept constant when frying.

In addition, since the first oil filter device 107 is located below the frying oil container 103 and the second oil filter device 113 is located above the frying oil container 103, the size of the automatic oil filtering fryer 10 can be compact for its configurations and does not occupy a big space.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An automatic oil filtering fryer comprising: a frying oil container (103) that is filled with oil so that an ingredient is to be fried therein and that has an outlet (103O) through which used oil (O0) inside the frying oil container (103) is discharged, and an inlet (103I) through which filtered oil through automatic oil filtering is supplied;

an oil discharging pipe (109) one end connected to the outlet (103O), the other end extending downward to be connected to a first oil filtering device (107), and transferring the used oil (O0) to the first oil filtering device (107);

the first oil filtering device (107) located below the frying oil container (103), receiving the used oil (O0) from the frying oil container (103) through the oil discharging pipe (109), and filtering the used oil (O0) to form first filtered oil (O1);

an oil transferring pipe (111) one end connected to the first oil filtering device (107), the other end extending upward to be connected to a second oil filtering device (113), and transferring the first filtered oil (O1) up to the second oil filtering device (113) by using a pump (112);

the pump (112) that is installed on the oil transferring pipe (111) and pumps to raise the first filtered oil (O1) inside the first oil filtering device (107) upward to transfer the first filtered oil (O1) to the second oil filtering device (113);

the second oil filtering device (113) located above the frying oil container (103), receiving the first filtered oil (O1) from the first oil filtering device (107) through the transferring pipe and the pump (112), and filtering the first filtered oil (O1) to form second filtered oil (O2); and an oil supplying pipe (115) one end connected to the second oil filtering device (113), the other end extending downward to be connected to the inlet (103I) of the frying oil container (103) and supplying the second filtered oil (O2) to the frying oil container (103), wherein the first oil filtering device (107) includes:

a metal mesh part (107M) directly receiving the used oil (O0) transferred through the oil discharging pipe (109) and filtering the used oil (O0 to form first primary filtered oil (O11) by passing the used oil through the metal mesh part (107M);

a grinder (107G) installed on an inner space of a first outer container (107C) and grinding debris contained in the first primary filtered oil (O11) to form first filtered oil (O1); and the first outer container (107C) formed to contain the metal mesh part (107M) and the grinder (107G), receiving the first filtered oil (O1), and transferring the first filtered oil (O1) to the oil transferring pipe (111).

2. The automatic oil filtering fryer of claim 1, wherein a bottom surface of the frying oil container (103) includes a slope part (103S) that is inclined from a first edge (103SE1) of the slope part (103S) toward a second edge (103SE2) of the slope part (103S) that is positioned in an opposite side of the first edge (103SE1), wherein a depth of the slope part (103S) becomes deeper as the slope part goes from the first edge (103SE1) to the second edge (103SE2), wherein a width of the slope part (103S) becomes narrower as the slope part goes from the first edge (103SE1) to the second edge (103SE2).

3. The automatic oil filtering fryer of claim 2, wherein the outlet (103O) is positioned at a lower portion of a sidewall of the frying oil container (103) that meets the second edge (103SE2).

4. The automatic oil filtering fryer of claim 1, further comprising a valve (110) that is installed on the oil discharging pipe (109) and adjusts opening degrees of the oil discharging pipe (109) to control an oil level of the frying oil container (103) and a rate of the automatic oil filtering.

5. The automatic oil filtering fryer of claim 1, wherein the first outer container (107C) includes a first sidewall that the oil transferring pipe (111) is connected to and communicated with and a second sidewall that is located in an opposite side to the first sidewall, wherein the grinder (107G) is installed on the second sidewall.

6. The automatic oil filtering fryer of claim 1, wherein the grinder (107G) includes:

a motor (107GM) providing rotational power;

a circular plate (107GP) connected to the motor and rotating according to the rotation of the motor (107GM); and a plurality of blades (107GB) coupled onto the circular plate (107GP), wherein debris contained in the first primary filtered oil (O11) is pulverized by the plurality of rotating blades (107GB).

7. The automatic oil filtering fryer of claim 1, wherein the metal mesh part (107M) is configured to have a container shape.

8. The automatic oil filtering fryer of claim 1, wherein the metal mesh part (107M) is configured to have a flat shape, wherein the metal mesh part (107M) includes a metal mesh (107MM) and a frame (107MF) surrounding an edge of the metal mesh (107MM).

9. An automatic oil filtering fryer of claim 1, comprising:

wherein a heating unit (105) is installed inside the frying oil container (103) and heating the oil (O0).

10. The automatic oil filtering fryer of claim 9, wherein the heating unit (105) comprises a plurality of metal fibers.

11. An automatic oil filtering fryer, comprising:

a frying oil container (103) that is filled with oil so that an ingredient is to be fried therein and that has an outlet (103O) through which used oil (O0) inside the frying oil container (103) is discharged, and an inlet (103I) through which filtered oil through automatic oil filtering is supplied;

an oil discharging pipe (109) one end connected to the outlet (103O), the other end extending downward to be connected to a first oil filtering device (107), and transferring the used oil (O0) to the first oil filtering device (107);

the first oil filtering device (107) located below the frying oil container (103), receiving the used oil (O0) from the frying oil container (103) through the oil discharging pipe (109), and filtering the used oil (O0) to form first filtered oil (O1);

an oil transferring pipe (111) one end connected to the first oil filtering device (107), the other end extending upward to be connected to a second oil filtering device (113), and transferring the first filtered oil (O1) up to the second oil filtering device (113) by using a pump (112);

the pump (112) that is installed on the oil transferring pipe (111) and pumps to raise the first filtered oil (O1) inside the first oil filtering device (107) upward to transfer the first filtered oil (O1) to the second oil filtering device (113);

the second oil filtering device (113) located above the frying oil container (103), receiving the first filtered oil (O1) from the first oil filtering device (107) through the transferring pipe and the pump (112), and filtering the first filtered oil (O1) to form second filtered oil (O2); and an oil supplying pipe (115) one end connected to the second oil filtering device (113), the other end extending downward to be connected to the inlet (103I of the frying oil container (103 and supplying the second filtered oil (O2) to the frying oil container (103), wherein the second oil filtering device (113) includes:

a frame part (113M) on which a fabric part (113P) is mounted;

the fabric part (113P) directly receiving the first filtered oil (O1) transferred through the oil transferring pipe (111) and filtering the first filtered oil (O1) to form second filtered oil (O2) by passing it the first filtered oil through the fabric part (113P); and a second outer container (113C) formed to contain the frame part (113M) and the fabric part (113P), receiving the second filtered oil (O2) discharged from the fabric part (113P), and supplying the second filtered oil (O2) to the frying oil container (103) through the oil supplying pipe (115).

12. The automatic oil filtering fryer of claim 11, wherein the fabric part (113P) is made of a material that is manufactured with fibers, wherein a hole formed by adjacent wires of a metal mesh part (107M) is bigger than a hole formed by adjacent fibers of the fabric part (113P).

13. The automatic oil filtering fryer of claim 11, wherein each of the frame part (113M) and the fabric part (113P) is configured to have a container shape, and the fabric part (113P) is configured to cover an inner surface of the frame part (113M).

14. The automatic oil filtering fryer of claim 11, wherein each of the frame part (113M) and the fabric part (113P) is configured to have a flat shape, and the fabric part (113P) is located above the frame part (113M) inside the second outer container (113C), wherein the frame part (113M) includes a metal mesh (113MM) and a frame (113MF) surrounding an edge of the metal mesh (113MM).

15. An automatic oil filtering fryer comprising:

a frying oil container (103) that includes a bottom surface having a slope part (103S), wherein as it the slope part goes from the first edge (103SE1) to the second edge (103SE2), a depth of the slope part (103S) becomes deeper and a width of the slope part (103S) becomes narrower, wherein an outlet (103O) through which used oil (O0) is discharged, is positioned at a lower portion of a sidewall of the frying oil container (103) that meets a lowest edge of the slope part (103S);

a first oil filtering device (107) located below the frying oil container (103), filtering the used oil (O0) to form first filtered oil (O1), and including:

a metal mesh part (107M) directly receiving the used oil (O0) from the frying oil container (103) through an oil Discharging pipe (109) connected to the outlet (103O), and filtering the used oil (O0) to form first primary filtered oil (O11) by passing the used oil through the metal mesh part (107M);

a grinder (107G) installed on an inner space of the first outer container (107C) and grinding debris contained in the first primary filtered oil (O11) to form first filtered oil (O1); and a first outer container (107C) formed to contain the metal mesh part (107M) and the grinder (107G), receiving the first filtered oil (O1), and transferring the first filtered oil (O1) to a transferring pipe (111);

a pump (112) raising the first filtered oil (O1) from the first oil filtering device (107) upward and supplying the first filtered oil to a second oil filtering device (113);

the second oil filtering device (113) located above the frying oil container (103), filtering the first filtered oil (O1) to form second filtered oil (O2), and including:

a frame part (113M) on which a fabric part (113P) is mounted;

the fabric part (113P) directly receiving the first filtered oil (O1) transferred from the first oil filtering device (107) through an oil transferring pipe (111) and filtering the first filtered oil (O1) to form the second filtered oil (O2) by passing the first filtered oil through the fabric part (113P);

and a second outer container (113C) formed to contain the frame part (113M) and the fabric part (113P), receiving the second filtered oil (O2) discharged from the fabric part (113P), and supplying the second filtered oil (O2) to the frying oil container (103) through an oil supplying pipe (115).

16. The automatic oil filtering fryer of claim 15, wherein the first outer container (107C) includes a first sidewall that the oil transferring pipe (111) is connected to and communicated with and a second sidewall that is located in an opposite side to the first sidewall, wherein the grinder (107G) is installed on the second sidewall.

17. The automatic oil filtering fryer of claim 15, wherein the grinder (107G) includes:

a motor (107GM) providing rotational power;

a circular plate (107GP) connected to the motor and rotating according to the rotation of the motor; and a plurality of blades (107GB) coupled onto the circular plate, wherein debris contained in the first primary filtered oil (O11) is pulverized by the plurality of rotating blades (107GB).

18. The automatic oil filtering fryer of claim 15, further comprising a valve (110) that is installed on the oil discharging pipe (109) and adjusts opening degrees of the oil discharging pipe (109) to control an oil level of the frying oil container (103) and a rate of the automatic oil filtering.

19. The automatic oil filtering fryer of claim 15, wherein a heating unit (105) is installed inside the frying oil container (103) and heating the oil (O0), wherein the heating unit (105) comprises of a plurality of metal fibers.

* * * * *